US012631449B2

(12) United States Patent
Ma et al.

(10) Patent No.: US 12,631,449 B2
(45) Date of Patent: *May 19, 2026

(54) FULLY DECOUPLED THREE-AXIS MEMS GYROSCOPE

(71) Applicant: AAC Kaitai Technologies (Wuhan) CO., LTD, Wuhan (CN)

(72) Inventors: Zhao Ma, Wuhan (CN); Zhan Zhan, Wuhan (CN); Shan Yang, Wuhan (CN); Xiao Kan, Wuhan (CN); Shitao Yan, Wuhan (CN); Hongtao Peng, Wuhan (CN); Yang Li, Wuhan (CN); Kahkeen Lai, Singapore (SG); Qiuyu Tan, Singapore (SG)

(73) Assignee: AAC Kaitai Technologies (Wuhan) CO., LTD, Wuhan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/920,010

(22) PCT Filed: Aug. 3, 2022

(86) PCT No.: PCT/CN2022/110022
§ 371 (c)(1),
(2) Date: Oct. 19, 2022

(87) PCT Pub. No.: WO2024/011679
PCT Pub. Date: Jan. 18, 2024

(65) Prior Publication Data
US 2025/0137785 A1 May 1, 2025

(30) Foreign Application Priority Data
Jul. 15, 2022 (CN) .......................... 202210854566.5

(51) Int. Cl.
| | |
|---|---|
| *G01C 19/5747* | (2012.01) |
| *G01C 19/5621* | (2012.01) |
| *G01C 19/5656* | (2012.01) |

(52) U.S. Cl.
CPC ..... *G01C 19/5656* (2013.01); *G01C 19/5747* (2013.01)

(58) Field of Classification Search
CPC .............. G01C 19/5621; G01C 19/574; G01C 19/5747; G01C 19/5712
See application file for complete search history.

(56) References Cited

U.S. PATENT DOCUMENTS

| | | | |
|---|---|---|---|
| 12,222,203 B2 * | 2/2025 | Ma ...................... | G01C 19/5712 |
| 2011/0154898 A1 * | 6/2011 | Cazzaniga ......... | G01C 19/5747 73/504.12 |

(Continued)

FOREIGN PATENT DOCUMENTS

CN         110940329 A   *   3/2020

*Primary Examiner* — Stephen D Meier
*Assistant Examiner* — Ruben C Parco, Jr.
(74) *Attorney, Agent, or Firm* — Wiersch Law Group

(57) ABSTRACT

Provided is a fully decoupled MEMS gyroscope, including a base, a sensing unit elastically connected to the base, and a driving unit coupled with the sensing unit and driving the sensing unit to move. The base includes a coupling anchor point located at a center of a rectangle and a coupling structure elastically connected to the coupling anchor point. The driving unit includes four driving members located at inner positions of four corners of the rectangle. The sensing unit includes two X mass blocks symmetrically arranged in two of the avoiding intervals, two Y mass blocks symmetrically arranged in the other two of the avoiding intervals, four Z mass blocks elastically connected to the adjacent driving members and located at the four corners of the rectangle, and four Z detection decoupling members elastically connected (Continued)

to the adjacent Z mass blocks and elastically connected to each other around the rectangle.

8 Claims, 9 Drawing Sheets

(56)                    References Cited

U.S. PATENT DOCUMENTS

| | | | |
|---|---|---|---|
| 2012/0024056 A1* | 2/2012 | Hammer | G01C 19/5712 |
| | | | 73/504.02 |
| 2012/0048017 A1* | 3/2012 | Kempe | G01C 19/5747 |
| | | | 73/504.12 |
| 2013/0031977 A1* | 2/2013 | Kempe | G01C 19/56 |
| | | | 73/504.04 |
| 2015/0059473 A1* | 3/2015 | Jia | G01C 19/5747 |
| | | | 73/504.12 |
| 2015/0300821 A1* | 10/2015 | Takizawa | G01C 19/574 |
| | | | 73/504.12 |
| 2018/0180419 A1* | 6/2018 | Geisberger | G01C 19/5747 |
| 2019/0120625 A1* | 4/2019 | Lo | B81B 3/0059 |
| 2021/0088335 A1* | 3/2021 | Lee | G01C 19/5762 |

* cited by examiner

FULLY DECOUPLED THREE-AXIS MEMS GYROSCOPE

TECHNICAL FIELD

The present application relates to the technical field of MEMS sensors, in particular to a fully decoupled three-axis MEMS gyroscope.

BACKGROUND

Micro-Electro-Mechanical System (MEMS) gyroscopes, also known as silicon micro-electromechanical gyroscopes, are miniature angular velocity sensors produced by applying micromachining technology and microelectronic technology.

A MEMS out-of-plane swing gyroscope is a typical representative of MEMS out-of-plane detection gyroscope. A drive mode of the MEMS swing gyroscope swings around an axis of a vertical mass block. When an angular velocity Ω is applied, the gyroscope transfers energy to the sensitive mode due to the Coriolis Effect, causing the vibrating disk to swing out-of-plane under relative drive. A size of Ω may be obtained by detecting displacement of the out-of-plane swing.

Chinese Patent Publication No. 111578921 discloses a micro-electromechanical multi-axis gyroscope, in which the design of the orthogonally arranged four-mass three-axis gyroscope structure determines that the sense modes of its three axes are coupled with each other, and the errors are superimposed, resulting in excessive errors.

In order to overcome the above defects of the relate art, it is necessary to develop a three-axis MEMS gyroscope to realize differential detection.

SUMMARY

An object of the present application is to provide a fully decoupled three-axis gyroscope, so as to solve the problem of weak coupling among the mass structures of the gyroscope and the inability to guarantee the displacement ratio of the mass blocks in the related art.

The technical solution of the present application is as follows: a fully decoupled three-axis Micro-Electro-Mechanical System (MEMS) gyroscope, comprising:

a base, comprising:

a coupling anchor point located at a center of a rectangle; and a coupling structure elastically connected to the coupling anchor point;

a driving unit coupled with a sensing unit and driving the sensing unit to move, comprising:

four driving members respectively located at inner positions of four corners of the rectangle and elastically connected to the base, wherein the four driving members are all frame-shaped and annularly and symmetrically arranged around the coupling anchor point, and an avoiding interval is formed between adjacent driving members; and the sensing unit elastically connected to the base, comprising:

two X mass blocks symmetrically arranged in two of the avoiding intervals oppositely arranged and elastically connected to the coupling structure and the driving member;

two Y mass blocks symmetrically arranged in the other two of the avoiding intervals oppositely arranged and elastically connected to the coupling structure and the driving member;

four Z mass blocks elastically connected to the adjacent driving members and located at the four corners of the rectangle; and four Z detection decoupling members respectively elastically connected to the adjacent Z mass blocks and arranged around the rectangle, wherein the adjacent Z detection decoupling members are elastically connected.

In one embodiment, the coupling structure comprises an inner coupling ring covered on the coupling anchor point, and an outer coupling ring covered on the inner coupling ring; an inner side of the inner coupling ring extends along a direction of a center line of the rectangle to form two inner coupling beams connected to the coupling anchor point, and an inner side of the outer coupling ring extends along a straight line perpendicular to the two inner coupling beams to form two outer coupling beams connected to the inner coupling ring.

In one embodiment, a first connecting beam with a bent portion is formed at a position of each X mass block and each Y mass block that is close to the corresponding coupling structure and is extended toward the outer coupling ring, and an end of the first connecting beam away from the driving member is connected to an outer wall of the corresponding outer coupling ring.

In one embodiment, the base further comprises connecting beam anchor points, and outer walls of the two corners of one end of each driving member close to the connecting beam anchor point are both extended outward to form a second connecting beam; an end of the second connecting beam away from the driving member is connected to the connecting beam anchor point, and the second connecting beam is located in a space between an outer wall of the driving member and the connecting beam anchor point.

In one embodiment, the X mass blocks and the Y mass blocks are each provided with a groove, and a groove wall of each groove is extended outward to form a guide beam, and an end of the guide beam away from the groove wall is connected to the connecting beam anchor point, and the first connecting beam is located in the groove and is bent and extended along a direction of the groove.

In one embodiment, each driving member is parallel to each Z mass block, and two sides of an outer wall of each driving member close to one end of each Z mass block are both extended to form a first flexible beam; an end of the first flexible beam away from each driving member is connected to each Z mass block, and the first flexible beam is located in a space between the outer wall of each driving member and each Z mass block.

In one embodiment, each Z detection decoupling member is in a shape of a frame, which is parallel to the Z mass block and is arranged outside each Z mass block and is spaced apart from the Z mass block to form a slit; outer walls of both ends of a bottom corner of each Z detection decoupling member are both extended outward to form a third connecting beam connected to each Z mass block; each third connecting beam is located in a space between each Z detection decoupling member and each Z mass block; the base further comprises decoupling member anchor points located in a space between each Z detection decoupling member and each Z mass block and located at both ends of the Z mass block, and two sides of each Z detection decoupling member are both extended outward to form a second flexible beam with a bent portion and connected to each decoupling member anchor point.

In one embodiment, the base further comprises a side anchor point; a third flexible beam whose middle portion is connected to the side anchor point is extended from both sides of a top of the Z detection decoupling member, and a middle portion of the third flexible beam is extended toward the groove opened inside the side anchor point to form a bent portion.

In one embodiment, an end of each X mass block away from the coupling structure and an end of each Y mass block away from the coupling structure is provided with a lateral slit; the base further comprises intermediate structures spaced apart from a side of each X mass block away from the coupling structure or a side of each Y mass block away from the coupling structure, and each X mass block and each Y mass block are both extended toward the lateral slit to form a lateral flexible beam connected to the intermediate structure.

In one embodiment, a driving transducer is arranged in each driving member; an out-of-plane transducer is arranged in each X mass block; a Y-plane detection transducer is arranged in each Y mass block, and a Z-plane detection transducer is arranged in each Z mass block.

The present application has the following beneficial effects.

1. The sensitive mass and detection electrodes of the gyroscope are symmetrically arranged, which is convenient for differential detection.

2. The gyroscope drive mode is differential drive, which can effectively improve the stability and shock resistance of the gyroscope drive.

3. The sense modes of the XYZ axes of the gyroscope can realize anti-phase vibration, so the differential detection of the gyroscope can be realized, and the impact of acceleration shock and quadrature error can be effectively immune.

4. The X mass blocks and the Y mass blocks are elastically connected to the anchor points through the decoupling structure, which effectively reduces the coupling between the different modal motions of the mass blocks, reduces the displacement of the non-moving mass blocks, and reduces the orthogonal error, which is beneficial to the bias stability of the sensor.

5. The Z detection mass is connected by a coupling beam, which effectively suppresses the detection parasitic mode and improves the detection accuracy of the gyroscope detection.

6. The angular velocity of the three axes of the gyroscope is independently detected, which effectively avoids the coupling of detection errors of different axes and improves the detection accuracy of the gyroscope.

DETAILED DESCRIPTION OF THE EMBODIMENTS

The present application will be further described below with reference to the accompanying drawings and embodiments.

Figure 1:
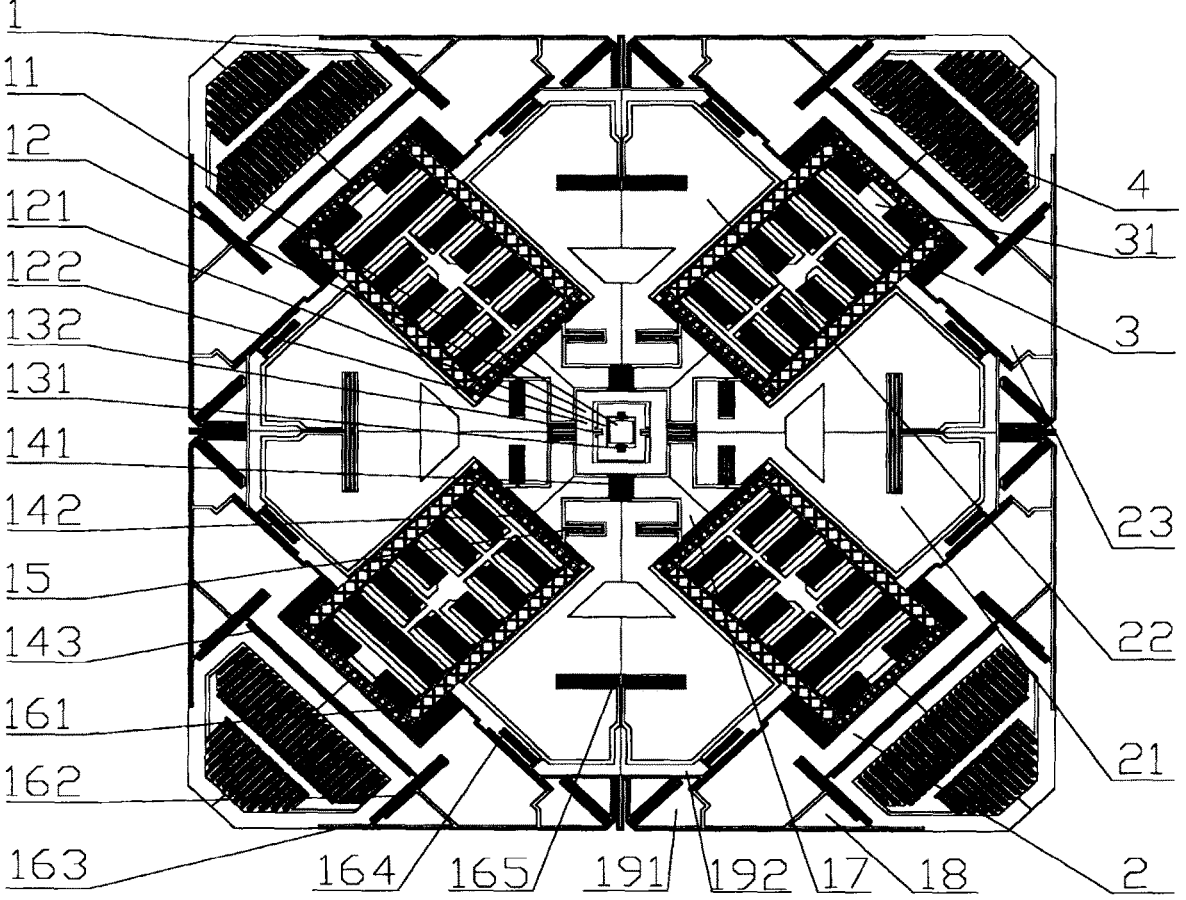
FIG. 1 is a plane structure of a Micro-Electro-Mechanical System (MEMS) gyroscope according to the present application.

As shown in FIG. 1, a fully decoupled three-axis Micro-Electro-Mechanical System (MEMS) gyroscope includes a base 1, a sensing unit 2 elastically connected to the base 1, and a driving unit 3 coupled with the sensing unit 2 and driving the sensing unit 2 to move.

The base 1 includes a coupling anchor point 11 located at a center of a rectangle and a coupling structure 12 elastically connected to the coupling anchor point 11.

The driving unit 3 includes four driving members 31 respectively located at the inner positions of four corners of the rectangle and elastically connected to the base 1. The four driving members 31 are all frame-shaped and annularly and symmetrically arranged around the coupling anchor point 11, and an avoiding interval is formed between adjacent driving members 31.

The sensing unit 2 includes two X mass blocks 21 symmetrically arranged in the two of the avoiding intervals oppositely arranged and elastically connected to the coupling structure 12 and the driving member 31, two Y mass blocks 22 symmetrically arranged in the other two of the avoiding intervals oppositely arranged and elastically connected to the coupling structure 12 and the driving member 31, four Z mass blocks 23 elastically connected to the adjacent driving members 31 and located at the four corners of the rectangle, and four Z detection decoupling members 4 respectively elastically connected to the adjacent Z mass blocks and arranged around the rectangle, wherein the adjacent Z detection decoupling members 4 are elastically connected.

The coupling structure 12 includes an inner coupling ring 121 covered on the coupling anchor point 11, and an outer coupling ring 122 covered on the inner coupling ring 121. An inner side of the inner coupling ring 121 extends along a direction of a center line of the rectangle to form two inner coupling beams 131 connected to the coupling anchor point 11. An inner side of the outer coupling ring 122 extends along a straight line perpendicular to the two inner coupling beams 131 to form two outer coupling beams 132 connected to the inner coupling ring 121.

A first connecting beam 141 with a bent portion is formed at a position of each X mass block 21 and each Y mass block 22 that is close to the corresponding coupling structure 12 and is extended toward the outer coupling ring 122. An end of the first connecting beam 141 away from the driving member 31 is connected to an outer wall of the corresponding outer coupling ring 122.

The base 1 further includes connecting beam anchor points 17 among the coupling structure 12, the X mass blocks 21, the Y mass blocks 22 and the driving members 31. Outer walls of the two corners in one end of each driving member 31 close to the connecting beam anchor point 17 are both extended outward to form a second connecting beam 142. An end of the second connecting beam 142 away from the driving member 21 is connected to the second connecting beam 142. The second connecting beam 142 is located in a space between the outer wall of the driving member 31 and the connecting beam anchor point 17.

Both sides of one end of each X mass block 21 and each Y mass block 22 close to the connecting beam anchor point 17 are respectively provided with a groove. A groove wall of each groove is extended outward to form a guide beam 15. An end of the guide beam 15 away from the groove wall is connected to the connecting beam anchor point 17. The first connecting beam 141 is located in the groove and is bent and extended along a direction of the groove.

Each driving member 31 is embedded in an inner side of each Z mass block 23. Two sides of the outer wall of each driving member 31 close to one end of each Z mass block 23 are both extended to form a first flexible beam 161. An end of each first flexible beam 161 away from each driving member 31 is connected to each Z mass block 23. Each first flexible beam 161 is located in a space between the outer wall of each driving member 31 and each Z mass block 23.

Each Z detection decoupling member 4 is in a shape of a frame, and its shape is matched with each Z mass block 23. The Z detection decoupling member 4 is arranged outside each Z mass block 23 and is spaced apart from each Z mass block 23 to form a slit. Outer walls of both ends of a bottom corner of each Z detection decoupling member 4 are both extended outward to form a third connecting beam 143 connected to the Z mass block 23. Each third connecting beam 143 is located between within a space between each Z detection decoupling member 4 and each Z detection decoupling member 4. The base further includes decoupling member anchor points 18 located within the space between each Z detection decoupling member 4 and each Z mass block 23 and located at both ends of the Z mass block 23. Two sides of each Z detection decoupling member 4 are both extended outward to form a second flexible beam 162 with a bent portion and connected to each decoupling member anchor point 18.

The base 1 further includes side anchor points 191 located in a space between each Z mass block 23 and each X mass block 21, or in a space between each Z mass block 23 and each Y mass block 22. Two sides of a top of each Z detection decoupling member 4 are both extended to form a third flexible beam 163 whose middle portion is connected to each side anchor point 191, and the middle portion of each third flexible beam 163 is extended toward a groove opened inside each side anchor point 191 to form a bent portion. Both sides of each driving member 31 are both extended along a direction of a space between each Z mass block 23 and each X mass block 21 or each Y mass block 22 to form two fourth flexible beams 164 of each side anchor points 191.

An end of each X mass block 21 away from the coupling structure 12 and an end of each Y mass block 22 away from the coupling structure 12 are both provided with a lateral slit. The base 1 further includes intermediate structures 192 spaced apart from a side of each X mass block 21 away from the coupling structure 12 or a side of each Y mass block 22 away from the coupling structure 12. Each lateral slit of each X mass block 21 and each lateral slit of the Y mass block 22 are both extended to form a lateral flexible beam 165 connected to each intermediate structure 192.

A driving transducer is arranged in each driving member 31. An out-of-plane transducer is arranged in the X mass block 21. A Y-plane detection transducer is arranged in each Y mass block 22, and a Z-plane detection transducer is arranged in each Z mass block 23.

Figure 2:
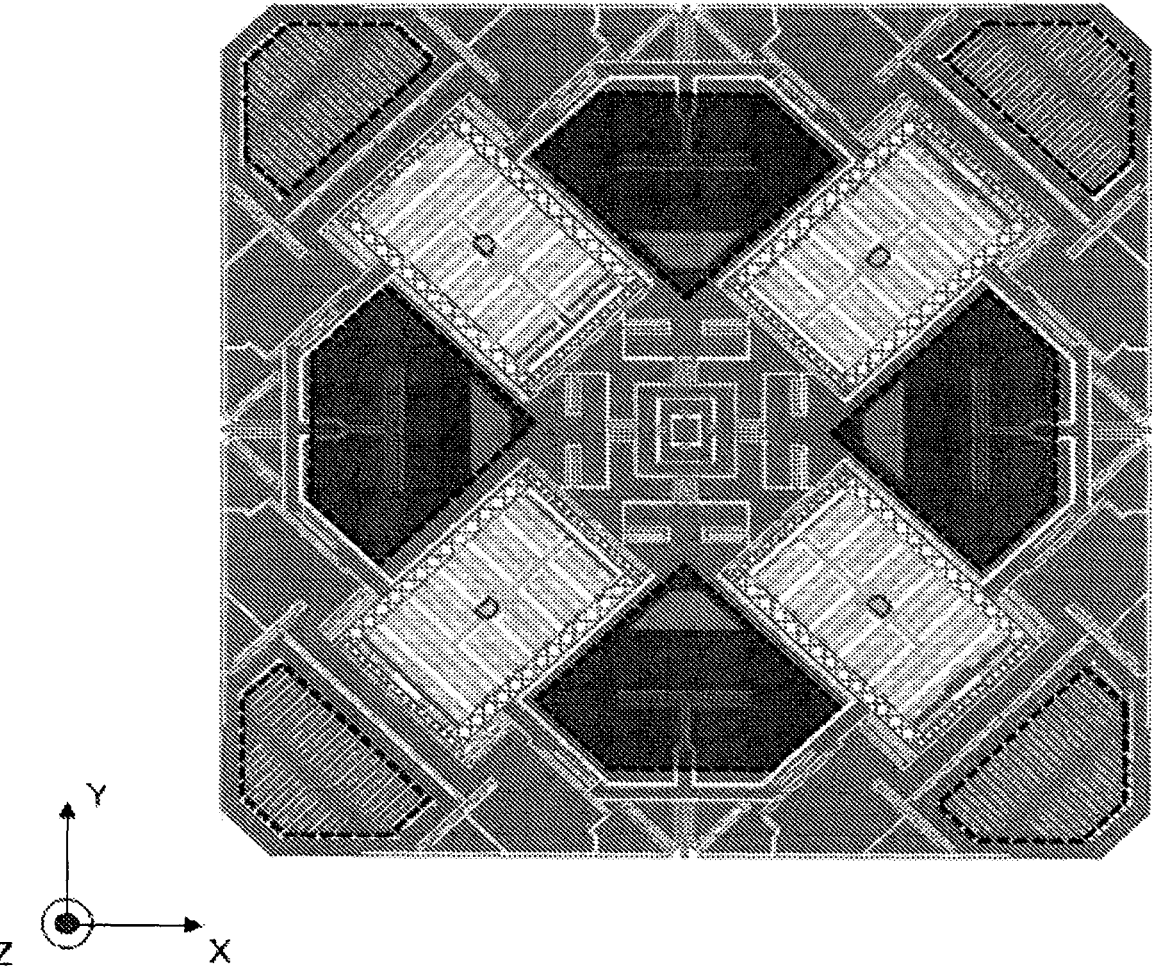
FIG. 2 is a top view of an arrangement positions of detection transducers (also called detection electrode) and in-plane drive transducers (also called in-plane drive electrode) in the MEMS gyroscope according to the present application.
Figure 3:
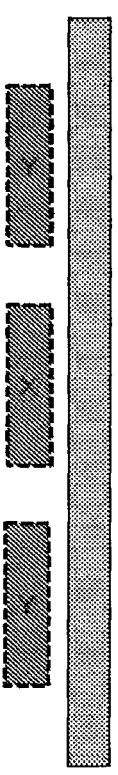
FIG. 3 is a side view of FIG. 2.

FIG. 2 is a top view of an arrangement positions of detection transducers (also called detection electrodes) and in-plane drive transducers (also called in-plane drive electrodes) in the MEMS gyroscope according to the present application. FIG. 3 is a side view of FIG. 2. Combined with the two accompanying drawings, it can be seen that a short side of each Z mass block and a short side of each driving member are spaced apart to form a rectangular avoiding interval. During operation, each in-plane driving transducer is arranged in each avoiding interval to drive the driving members to vibrate. The X-plane detection transducers and the Y-plane detection transducers are respectively arranged symmetrically above the X/Y mass blocks. The Z-plane detection transducer is embedded in the rectangular frame of the decoupling mass block.

In the present application, each driving member is connected to an anchor area through a flexible guide beam, and the flexible guide beam can provide a single-direction degree of freedom in the plane. Each X/Y mass block is connected to the coupling ring through a first flexible beam, and the first flexible beam can provide degrees of freedom of in-plane rotation and out-of-plane inversion. Each Z mass block is connected to each driving member through a second flexible beam, and the second flexible beam provides a single degree of freedom of each Z mass block perpendicular to the moving direction of each driving member. The decoupling structure is connected to each Z mass block through a third flexible beam, and the third flexible beam provides a single degree of freedom of the decoupling structure parallel to the moving direction of each driving member.

The gyroscope of the present application has four modes while working, one is a drive mode, and the other three modes are respectively X-axis sense mode, Y-axis sense mode and Z-axis sense mode. In the following, the angular velocity sensitivity principle of the gyroscope according to the present application will be explained as follows.

Figure 4:
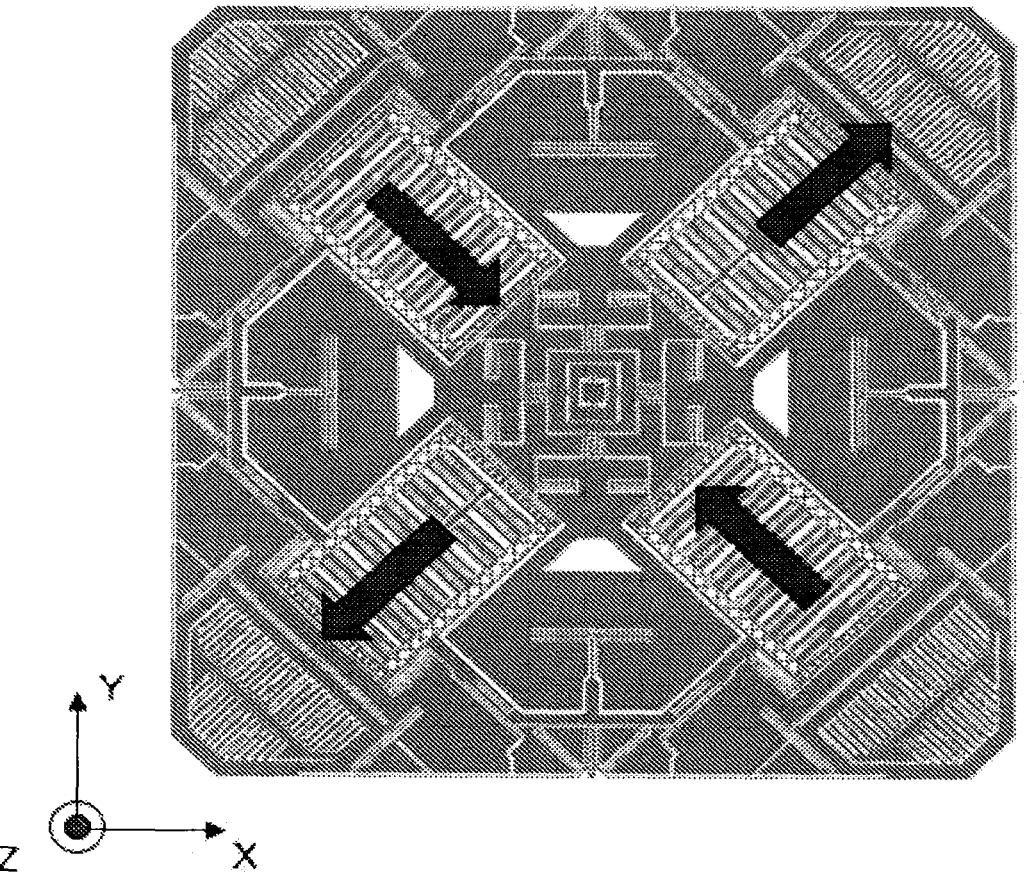
FIG. 4 is a diagram illustrating a drive mode of a Z-axis angle detection principle of the MEMS gyroscope according to the present application.
Figure 5:
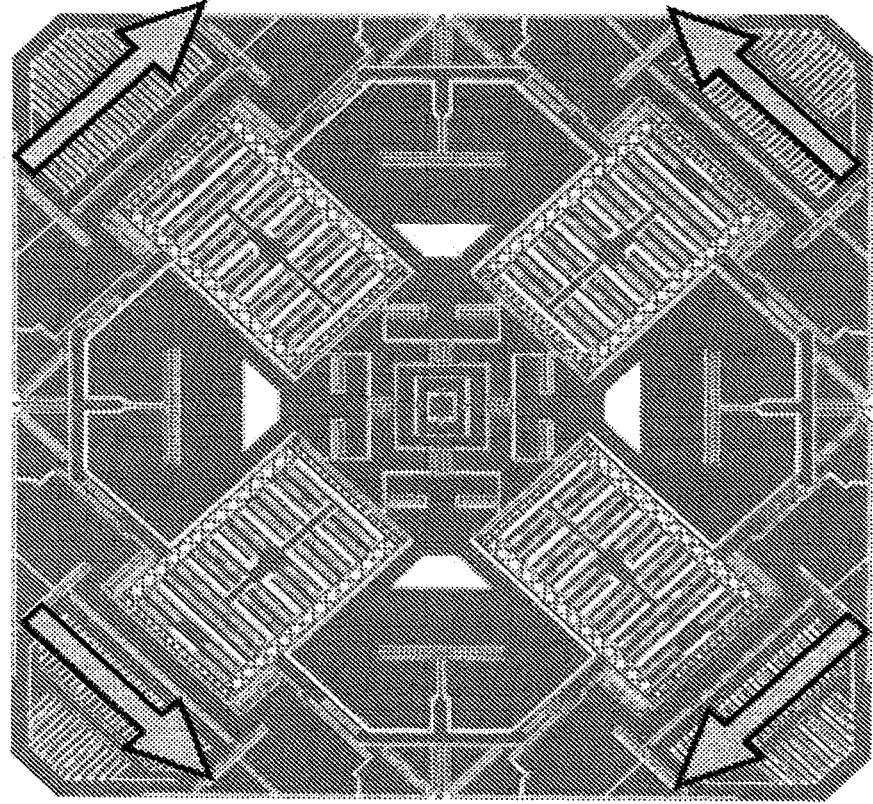
FIG. 5 is a diagram illustrating a sense mode of a Z-axis angle detection principle of the MEMS gyroscope according to the present application.

Specifically, FIG. 4 is a diagram illustrating a drive mode of a Z-axis angle detection principle of the MEMS gyroscope according to the present application. FIG. 5 is a diagram illustrating a sense mode of a Z-axis angle detection principle of the MEMS gyroscope according to the present application. Combined with the two accompanying drawings, it can be seen that, in a process of Z-axis angle detection, the gyroscope has two vibration modes. In the first mode, the Z mass blocks translates in an in-plane horizontal direction. In the second mode, the Z mass blocks translates in an in-plane vertical direction. The MEMS gyroscope in the new scheme is driven to vibrate in the drive mode. In this circumstance, when the gyroscope of the present application is subjected to a Z-axis angular velocity ω, according to the Coriolis principle, the angular velocity ω will generate a Coriolis force along the y-axis direction, and the Coriolis force will force the gyroscope of the present application to generate a vibration with a Z-axis sense mode. Finally, the magnitude of the angular velocity ω may be obtained by detecting the vibration displacement of the gyroscope of the present application along the y-axis direction.

Figure 6:
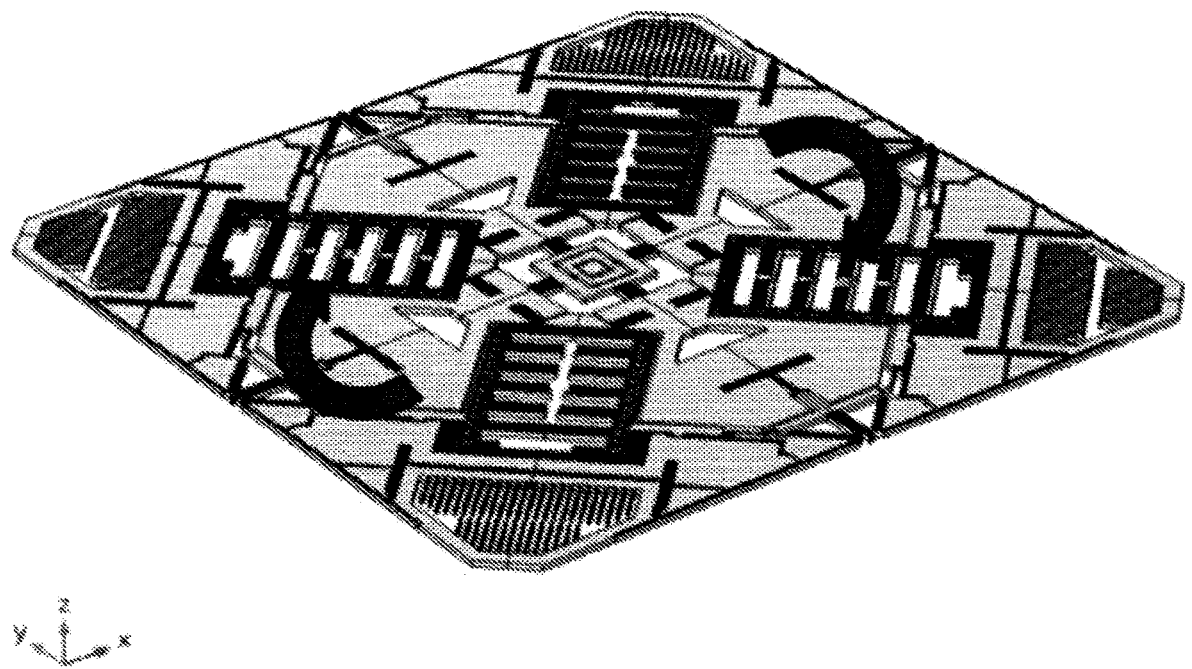
FIG. 6 is a diagram illustrating a drive mode of an X-axis angle detection principle of the MEMS gyroscope according to the present application.
Figure 7:
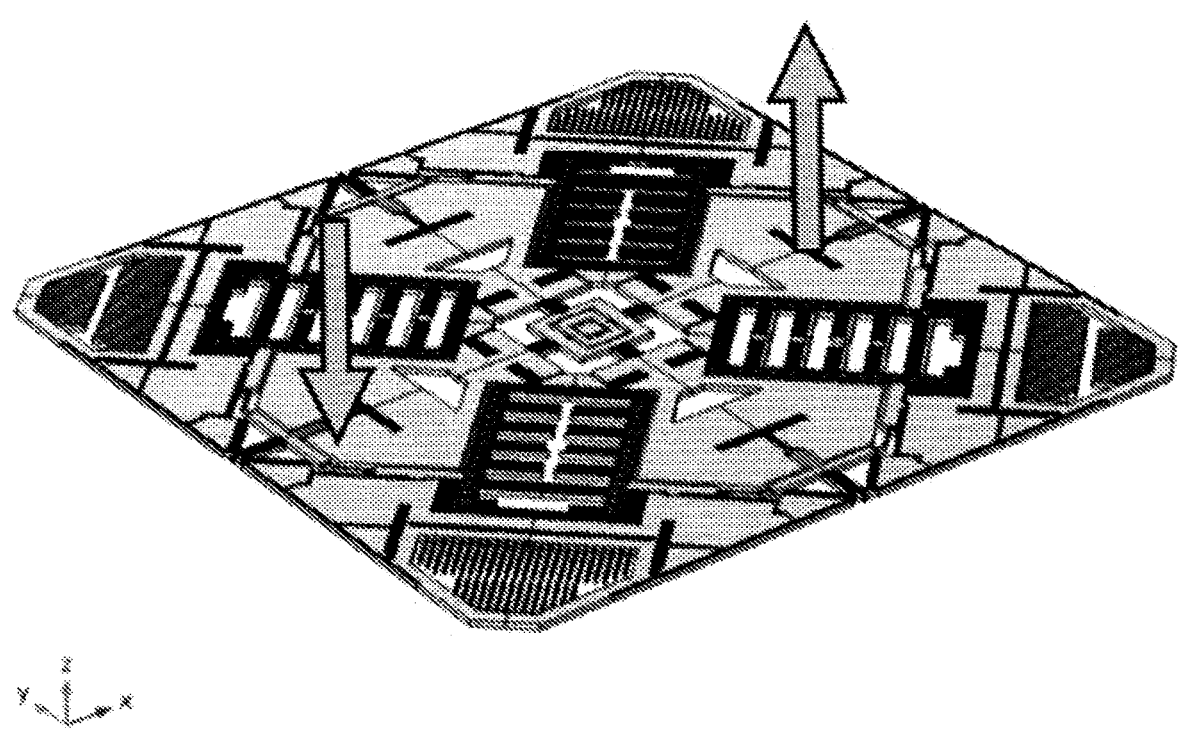
FIG. 7 is a diagram illustrating a sense mode of an X-axis angle detection principle of the MEMS gyroscope according to the present application.

FIG. 6 is a diagram illustrating a drive mode of an X-axis angle detection principle of the MEMS gyroscope according to the present application. FIG. 7 is a diagram illustrating a sense mode of an X-axis angle detection principle of the MEMS gyroscope according to the present application. Combined with the two accompanying drawings, it can be seen that, the gyroscope has two vibration modes in X-axis angle detection scheme. In the first mode, the X/Y mass blocks swing vertically. In the second mode, the X/Y mass blocks swings out of plane. With an external driving force, the gyroscope is driven to vibrate in the drive shape. In this circumstance, when the gyroscope of the present application is subjected to an X-axis angular velocity ω, according to the Coriolis principle, the angular velocity ω will generate a Coriolis force along a Z-axis direction, and the Coriolis force will force the gyroscope of the present application to generate a vibration with the X-axis sense mode. Finally, the magnitude of the angular velocity ω may be obtained by detecting the vibration displacement of the gyroscope of the present application along the Z-axis direction.

Figure 8:
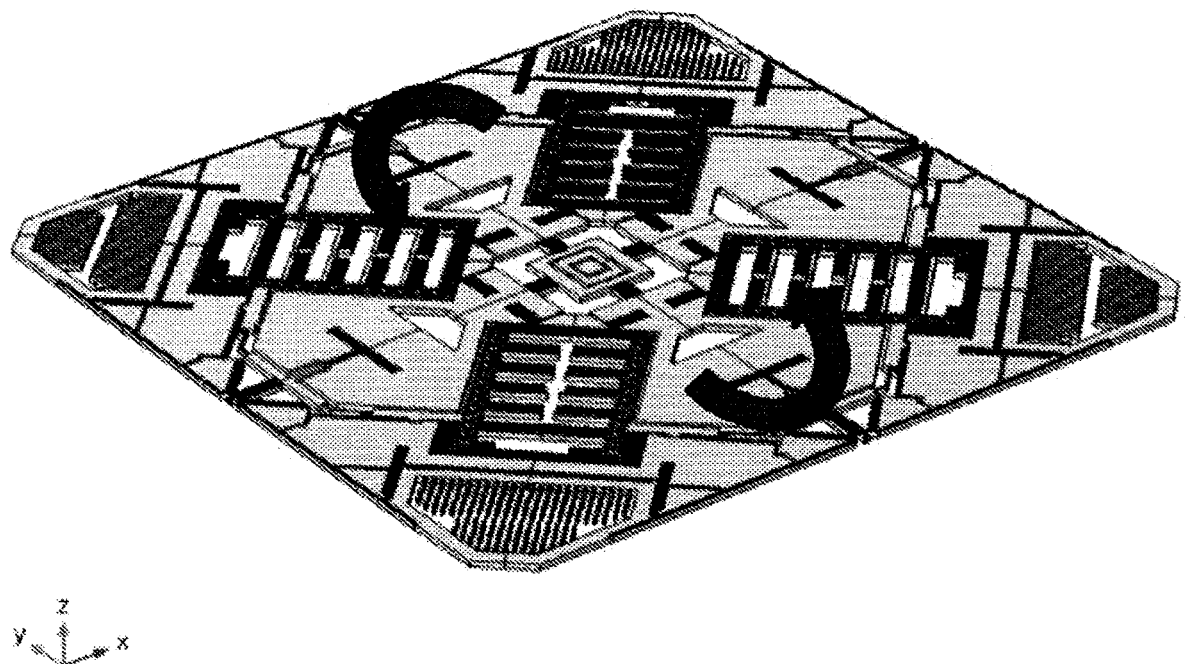
FIG. 8 is a diagram illustrating a drive mode of a Y-axis angle detection principle of the MEMS gyroscope according to the present application.
Figure 9:
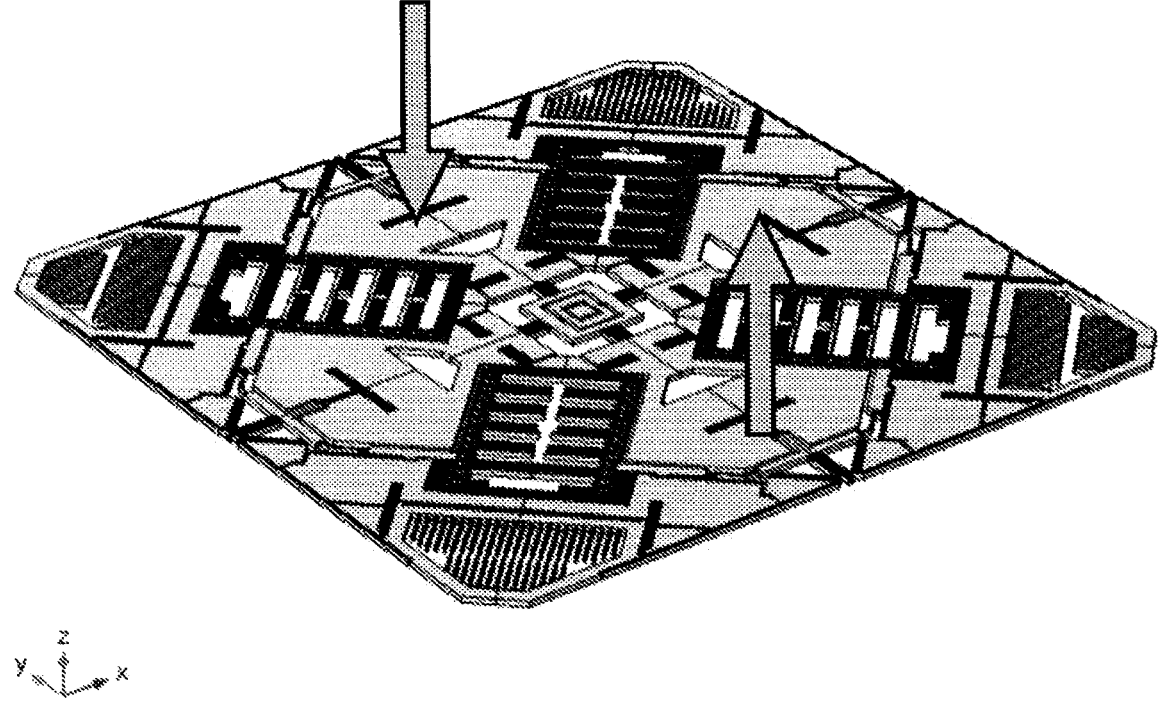
FIG. 9 is a diagram illustrating a sense mode of a Y-axis angle detection principle of the MEMS gyroscope according to the present application.

FIG. 8 is a diagram illustrating a drive mode of a Y-axis angle detection principle of the MEMS gyroscope according to the present application. FIG. 9 is a diagram illustrating a sense mode of a Y-axis angle detection principle of the MEMS gyroscope according to the present application. Combined the two accompanying drawings, it can be seen that, the gyroscope has two vibration modes in the Y-axis angle detection scheme. In the first mode, the X/Y mass blocks swing horizontally. In the second mode, the X/Y mass blocks swing out of plane. With an external driving force, the gyroscope is driven to vibrate in the drive mode. In this circumstance, when the gyroscope of the present application is subjected to a Y-axis angular velocity ω, according to the Coriolis principle, the angular velocity ω will generate a resultant Coriolis force along the Z-axis direction, and the resultant Coriolis force will force the gyroscope of the present application to generate a vibration with the Y-axis sense mode. Finally, the angular velocity ω may be obtained by detecting the vibration displacement of the gyroscope in the new scheme along the Z axis.

In practical engineering practice, the gyroscope has several capacitors, and the capacitors are configured to: a) generate an external driving force required to force the gyroscope of the present application to vibrate in the drive mode; b) detect a vibration displacement of the gyroscope along a vibration direction in the sense mode; c) suppress a quadrature error of the gyroscope.

Described above are only the embodiments of the present application. It should be pointed out that for those of ordinary skill in the art, improvements may be made without departing from the inventive concept of the present application, which belong to protection scope of the present application.

What is claimed is:

1. A decoupled three-axis MEMS gyroscope, the decoupled three axis MEMS gyroscope is in the shape of a rectangle; comprising:
   a base, comprising:
   a coupling anchor point located at a center of the rectangle; and
   a coupling structure elastically connected to the coupling anchor point;
   a driving unit coupled with a sensing unit and driving the sensing unit to move, comprising:

four driving members respectively located at inner positions of four corners of the rectangle and elastically connected to the base, wherein the four driving members are all frame-shaped and annularly and symmetrically arranged around the coupling anchor point, and an avoiding interval is formed between adjacent driving members; and the sensing unit elastically connected to the base, comprising:

two X mass blocks symmetrically arranged in two of the avoiding intervals oppositely arranged and each X mass block is elastically connected to the coupling structure and two of the four driving members are located on both sides of one of the X mass blocks;

two Y mass blocks symmetrically arranged in the other two of the avoiding intervals oppositely arranged and each Y mass block is elastically connected to the coupling structure and two of the four driving members are located on both sides of one of the Y mass blocks;

four Z mass blocks are located at the four corners of the rectangle, and each Z mass block is connected to one of the four driving members located at the corresponding corner of the rectangle; and four Z detection decoupling members respectively elastically connected to the adjacent Z mass blocks and arranged around the rectangle, wherein the adjacent Z detection decoupling members are elastically connected;

each Z mass block is located on an outside of each driving member away from the coupling anchor point, and each Z detection decoupling member is located on an outside of each Z mass block away from the coupling anchor point;

wherein the base further comprises side anchor points;

two sides of a top of each Z detection decoupling member are both extended to form a third flexible beam whose middle portion is connected to each side anchor point, and the middle portion of each third flexible beam is extended toward a groove opened inside each side anchor point to form a bent portion;

wherein an end of each X mass block away from the coupling structure and an end of each Y mass block away from the coupling structure is provided with a lateral slit;

the base further comprises intermediate structures spaced apart from a side of each X mass block away from the coupling structure or a side of each Y mass block away from the coupling structure, and each X mass block and each Y mass block are both extended toward the lateral slit to form a lateral flexible beam connected to the intermediate structure;

the end of each third flexible beam away from the Z detection decoupling member is connected to one of the intermediate structure;

both sides of each driving member are both extended along a direction of a space between each Z mass block and each X mass block or each Y mass block to form two fourth flexible beams of corresponding ones of the side anchor points, the end of each of the two fourth flexible beams away from the corresponding driving member is connected to one of the intermediate structures.

2. The decoupled three-axis MEMS gyroscope of claim 1, wherein the coupling structure comprises an inner coupling ring coupled with the coupling anchor point, and an outer coupling ring coupled with the inner coupling ring; an inner side of the inner coupling ring extends along a direction of a center line of the rectangle to form two inner coupling beams connected to the coupling anchor point, and an inner side of the outer coupling ring extends along a straight line perpendicular to the two inner coupling beams to form two outer coupling beams connected to the inner coupling ring.

3. The decoupled three-axis MEMS gyroscope of claim 2, wherein a first connecting beam with a bent portion is formed at a position of each X mass block and each Y mass block that is close to the corresponding coupling structure and is extended toward the outer coupling ring, and an end of the first connecting beam away from the driving member is connected to an outer wall of the corresponding outer coupling ring.

4. The decoupled three-axis MEMS gyroscope of claim 2, wherein the base further comprises connecting beam anchor points, and outer walls of the two corners of one end of each driving member close to the connecting beam anchor point are both extended outward to form a second connecting beam; and the second connecting beam is connected to the connecting beam anchor point, and each second connecting beam is located in a space between an outer wall of each driving member and the connecting beam anchor point.

5. The decoupled three-axis MEMS gyroscope of claim 4, wherein the X mass blocks and the Y mass blocks are each provided with a groove, and a groove wall of each groove is extended outward to form a guide beam, and an end of the guide beam away from the groove wall is connected to the connecting beam anchor point.

6. The decoupled three-axis MEMS gyroscope of claim 2, wherein each driving member is parallel to each Z mass block, and two sides of an outer wall of each driving member close to one end of each Z mass block are both extended to form a first flexible beam; an end of each first flexible beam away from each driving member is connected to each Z mass block, and each first flexible beam is located in a space between the outer wall of each driving member and each Z mass block.

7. The decoupled three-axis MEMS gyroscope of claim 6, wherein each Z detection decoupling member is in a shape of a frame, which is parallel to the Z mass block and is arranged outside each Z mass block and is spaced apart from the Z mass block to form a slit; outer walls of both ends of each Z detection decoupling member facing a corresponding one of the driving members are both extended outward to form a third connecting beam connected to each Z mass block; each third connecting beam is located in a space between each Z detection decoupling member and each Z mass block; the base further comprises decoupling member anchor points located in a space between each Z detection decoupling member and each Z mass block and located at both ends of the Z mass block, and two sides of each Z detection decoupling member are both extended outward to form a second flexible beam with a bent portion and connected to each decoupling member anchor point.

8. The decoupled three-axis MEMS gyroscope of claim 1, wherein a driving transducer is arranged in each driving member; wherein X-plane detection transducers are arranged symmetrically above the X mass blocks; wherein Y-plane detection transducers are arranged symmetrically above the Y mass blocks; and a Z-plane detection transducer is arranged in each Z mass block.

* * * * *